United States Patent [19]

Wallace

[11] Patent Number: 5,608,312
[45] Date of Patent: Mar. 4, 1997

[54] SOURCE AND SINK VOLTAGE REGULATOR FOR TERMINATORS

[75] Inventor: Dean Wallace, Trabuco Canyon, Calif.

[73] Assignee: Linfinity Microelectronics, Inc., Garden Grove, Calif.

[21] Appl. No.: 423,748

[22] Filed: Apr. 17, 1995

[51] Int. Cl.$^6$ ........................................................ H02J 1/02
[52] U.S. Cl. .......................... 323/224; 323/281; 323/269
[58] Field of Search .................................... 323/224, 285, 323/287, 316

[56] References Cited

U.S. PATENT DOCUMENTS

| | | | |
|---|---|---|---|
| 4,549,129 | 10/1985 | Hing et al. | 323/276 |
| 4,792,745 | 12/1988 | Dobkin . | |
| 4,831,283 | 5/1989 | Newton . | |
| 4,920,339 | 4/1990 | Friend et al. . | |
| 5,029,284 | 7/1991 | Feldbaumer et al. . | |
| 5,099,137 | 3/1992 | Lattin, Jr. . | |
| 5,120,909 | 6/1992 | Kutz et al. . | |
| 5,210,846 | 5/1993 | Lee . | |
| 5,239,559 | 8/1993 | Brach et al. . | |
| 5,239,658 | 8/1993 | Yamamuro et al. . | |
| 5,254,883 | 10/1993 | Horowitz et al. . | |
| 5,266,887 | 11/1993 | Smith | 323/316 |
| 5,272,396 | 12/1993 | Mammano et al. . | |
| 5,297,067 | 3/1994 | Blackborow et al. . | |
| 5,309,569 | 5/1994 | Warchol . | |
| 5,313,105 | 5/1994 | Samela et al. . | |
| 5,313,595 | 5/1994 | Lewis et al. . | |
| 5,319,755 | 6/1994 | Farmwald et al. . | |
| 5,336,948 | 8/1994 | Jordan . | |
| 5,338,979 | 8/1994 | Mammano et al. . | |
| 5,381,034 | 1/1995 | Thrower et al. . | |
| 5,398,326 | 3/1995 | Lee . | |

FOREIGN PATENT DOCUMENTS

| | | |
|---|---|---|
| 0341841 | 4/1989 | European Pat. Off. . |
| 0531630 | 3/1993 | European Pat. Off. . |
| 5233539 | 10/1993 | Japan . |

OTHER PUBLICATIONS

Linfinity Microelectronics, Production Data Sheet LX6431/LX6431A/LX6431B, Precision Programmable References Rev. 1.0, Oct. 1994.

Linfinity Microelectronics, Production Data Sheet TL431/TL431A/TL1431, Precision Programmable References Rev. 1.0, Jan. 1995.

Primary Examiner—Peter S. Wong
Assistant Examiner—Rajnikant B. Patel
Attorney, Agent, or Firm—Loeb & Loeb LLP

[57] ABSTRACT

A voltage regulator for use in controllable bus terminators providing a source and a sink to a regulated output without clamping circuitry is disclosed. The regulator maintains a voltage at a node by sourcing current into the node when a cable line sinks current from the node and sinking current from the node when a cable line sources current into the node. By avoiding the use of clamping circuitry, a voltage deadband between the regulator output voltage and the clamp circuit voltage is avoided.

19 Claims, 4 Drawing Sheets

SOURCE AND SINK VOLTAGE REGULATOR FOR TERMINATORS

BACKGROUND OF THE INVENTION

1. Area of the Art

This patent application relates to voltage regulators and more particularly relates to voltage regulators for terminators such as in busses.

2. Description of the Prior Art

Computer systems typically use an electronic bus to communicate signals between various computing devices such as a processor, a memory, and input/output (I/O) devices. A computer bus commonly communicates address, data, and control signals between the computing devices connected thereto. The signals are typically driven on the bus by drivers incorporated into each of the computing devices connected thereto.

A common computer peripheral interface is the Small Computer Systems Interface (SCSI). The SCSI bus is becoming increasingly popular because it reduces the I/O bottle neck in existing computer systems. However, as the data rates over the SCSI bus increase, and as the distances between the computer peripherals connected to the bus also increase, transmission line effects associated with the SCSI bus degrade the integrity of the data transmitted over the bus. Additionally, impedance mismatches between bus terminators and cable lines cause signal reflection and power loss. Reflections can also result in unintended assertions or negations, causing false data or addresses to be provided to components coupled to the bus.

The SCSI-2 computer bus requires operation at 10 megabytes per second over a bus cable length of 6 meters. Termination has become a critical design factor due to the increases in data rates, the potential distances between SCSI stubs, differences in cable design and other factors. For example, due to impedance mismatches on the SCSI bus, the acknowledge and request control signals may be reflected causing the acknowledge and request lines to be double clocked. One source of signal reflection is due to mismatches between cables having slightly different impedances. Another source of reflection is due to the "stubs" (i.e., the length of cable that is coupled to the primary SCSI bus) and the position of the stubs on the SCSI bus.

The SCSI physical interface contains specifications for maximum cable length, maximum number of devices, minimum and maximum cable impedance, maximum load capacitance, minimum driver rise/fall time, maximum termination current, minimum open circuit termination voltage, and various other requirements to maintain high bus speeds. The voltage waveform on the bus has a square wave characteristic and the voltage levels are TTL. The open circuit voltage of the terminator must be a minimum of 2.5 volts and the maximum output current is 24 milliamps for any voltage above 0.2 volts.

Meeting the SCSI specifications should minimize or eliminate problems from signal reflection due to impedance mismatching. However, this ideal is not met in practice but is approximated with varying extents by various manufacturers of terminators. Such approximations have included both passive terminators and active Boulay and current mode terminators. Unfortunately, while the specification can be readily satisfied on an individual component basis, in mass production there is great difficulty in maintaining tolerances sufficient to meet the specification. Consequently, most efforts in improving the performance of the SCSI bus have been directed at reducing the deleterious effects of the reflection problems associated with the SCSI bus. Various termination techniques have been attempted.

For example, passive terminators have been used for terminating single-ended SCSI-1 devices. FIG. 1 shows a typical passive terminator which provided reliable operation even when the SCSI bus was fully configured and run at maximum cable lengths. As shown in FIG. 1, the passive terminator 100 terminates a bus signal line 102 into a resistive load consisting of a 220 ohm resistor 104 connected to the terminator power line 106 and a 330 ohm resistor 108 connected to ground. The effective resistance of the passive terminator is equal to 132 ohms. However, the passive terminator 100 provided a resistive path between the terminator power line 106 and ground even when the signal line 102 is not active (i.e., at high impedance), resulting in continuous power dissipation even when all of the bus signal lines 102 are negated. For a terminator power voltage of 5.0 volts, the passive terminator 100 dissipates 50 mW (10.00 milliamps×5.0 volts) for every inactive bus signal line 102. Another disadvantage of the passive terminator 100 shown in FIG. 1 is that the Thevenin voltage is not regulated and thus varies with variations in the terminator power 106. For example, a terminator power variation between 4.25 volts and 5.25 volts causes the output voltage to vary from 2.55 volts to 3.15 volts. Consequently, a correspondingly large variation in the current supplied to an asserted bus signal line (e.g., signal line 102) through the 220 ohm resistor 104 is produced. Precision tolerance resistors (+/−1% or less) are required in order to limit the output current provided on bus signal line 102, thereby making the manufacture of the passive terminator 100 costly.

Active bus terminators, such as the Boulay terminator shown in FIG. 2, have also been developed. Active termination of the computer bus provides a potential reduction of reflection problems caused by impedance mismatches on the bus. In general, the prior art active terminators attempt to reduce the reflection by compensating for voltage drops and maintaining a constant stable voltage to the terminating equipment resistors. The Boulay terminator 200 shown in FIG. 2 uses an active voltage regulation technique to improve noise immunity and reduce average power dissipation. The linear voltage regulator 202 produces a voltage source of 2.85 volts on line 204. As shown in FIG. 2, the 2.85 volts is provided in series with a plurality of terminating resistors 206 which are connected to a plurality of computer bus signal lines 208. Typically, the plurality of terminating resistors 206 comprise 110 ohm resistors, having a 1% or better tolerance. The scheme shown in FIG. 2 is suited to terminate bus lines having a relatively low characteristic impedance, which is fairly common. Because the computer bus signal lines 208 are terminated by an active voltage regulation scheme, noise immunity is improved and a substantial reduction and average power dissipation results. The Boulay terminator reduces average power dissipation because a deasserted or high impedance line conducts no current through its respective terminating resistor 206. Thus, the only power dissipated by the Boulay terminator 200 for the negated line is the power dissipated by the linear voltage regulator 202. Typically, the linear voltage regulator 202 dissipates between 5.0 and 10.0 milliamps of current.

Furthermore, because the Thevenin voltage is regulated, the output current is substantially immune to variations in termination power. Disadvantageously, in order to provide the maximum current on the computer bus signal lines 208, the terminating resistors 206 typically must be high precision resistors. When the resistors are included on an integrated circuit device together with the regulator 202, laser trimming is required to produce resistors 206 having these low tolerance values. Consequently, the prior art Boulay terminators had high manufacturing costs.

FIG. 3 shows one attempt at providing a controllable bus terminator with voltage regulation at a plurality of termination impedances 398 connected through switchable elements such as bipolar transistors to the output of the voltage regulator. The voltage regulator 306 includes a differential amplifier 320, a transistor 340, a switchable current source 350, and a pass transistor 342. The emitter of the pass transistor 342 is coupled to the collectors of the switching transistors 300 as shown. The differential amplifier 320 cooperates with the transistor 340 and the switchable current source 350 in order to control the conduction of the pass transistor 342 and thereby hold the regulator's output voltage 327 constant. This regulated voltage is coupled to switching transistors 300 that couple the regulated voltage to the termination impedances 398. These transistors can either be conducting during operation or be open to disable the terminator.

To address the problem of transmission errors, double clocking of acknowledge and request lines, and effects of signal reflection, the embodiment of FIG. 3 employs a source only regulator and clamp circuitry. The source only regulator provides a current source when the cable lines 372 sink current away from the terminator. The clamp circuitry sinks current when the cable lines 372 source current into the terminator causing the voltage at the regulated node to drift upward.

Each bus line 372 includes a voltage clamp which has a clamping transistor 378 and a current source 374 connected through a diode 376 to ground 312. The base of clamping transistor 378 is connected between the current source 374 and diode 376. The emitter of the transistor 378 is connected to the bus line 372. If signal reflection sources current into the bus line 372, potentially causing the signal on the bus line 372 to negate, the clamping transistor 378 conducts to clamp the voltage on the bus line 372 at zero volts.

It is common to use push/pull drivers to negate a line or totem pole drivers to assert or negate so that the bus lines can be driven high or low rapidly. FIG. 4 shows an embodiment of a bus terminator employing totem pole drivers. The power supply VSS is coupled through a voltage regulator to a plurality of active terminators. The totem pole drivers 424a, 424b, ... and 424n are coupled to the respective cable lines. Each of the totem pull drivers 424a, 424b, ... and 424n have a structure with a first bipolar transistor coupled to the cable line at an emitter to provide a current source and a second bipolar transistor coupled to the cable line at a collector to provide a current sink. The cable lines are asserted when the second transistor sinks current from the cable line and negated when the first transistor sources current into the cable line.

When a bus terminator uses voltage regulation that sources current into the regulation node with push/pull or totem pole drivers, the line can be driven above the output voltage of the regulator with the line voltage drifting higher approaching the termination power supply voltage. This can cause the voltage regulator to lose regulation and make it more difficult to assert the line, often causing data transmission errors. To address this problem, prior art terminators have used voltage clamp circuitry, such the voltage clamps 522, to sink current when the voltage reaches a given voltage (somewhere above the regulator output voltage).

However, there are many problems using voltage clamp circuitry to combat the effects of signal reflection. First, clamping circuitry requires additional components. For example, the clamping circuitry of the embodiment of the FIG. 3 terminator employs a bipolar transistor 378 for each line and a current source 374. This requires a larger die area and consumes more power.

Second, clamping may result in a voltage deadband between the regulator output and the clamp circuit voltage. The clamping voltage must be above the desired reference voltage or the clamp will always be on, providing for higher current draw. If noise or reflections cause the cable voltage to drift above the desired voltage but below the clamping voltage, the drivers may not be able to negate the line, creating a deadband.

Consequently, there remains a need for bus terminators that do not require costly, high precision resistors. There is also a need to avoid the undesirable effects of clamping circuitry to overcome the problems of signal reflection due to impedance mismatching.

SUMMARY OF THE INVENTION

An objective of the present invention is to provide a voltage regulator that can source and sink current at a regulation node while providing a regulated voltage at the regulation node.

Another objective of the present invention is to provide a controllable bus terminator having a voltage reference that maintains the reference when current is driven back into the regulator from cable lines without the use of clamping circuitry.

Another object of the present invention is to provide a constant voltage source for a controllable bus terminator with no voltage deadband associated with termination schemes that maintain the regulation voltage by sourcing current into the regulation node when the cable line sinks current from the terminator and clamping the cable line to a reference voltage when the voltage exceeds a predetermined threshold.

Yet another object of the present invention is to provide improved signal quality over termination schemes using voltage regulation with a current source and clamp circuitry.

Briefly, the embodiments of the invention are directed to a voltage regulator providing a current source to $V_{cc}$ and a current sink to ground for the terminating line. The circuit for each terminated bus line preferably comprises two operational amplifiers each having an inverting input coupled to a common reference voltage. The outputs of the operational amplifiers are coupled to the control electrodes of first and second transistors respectively, where the control electrodes comprise one of a base and a gate. A second terminal of the first transistor, comprising one of an emitter and a source, is coupled to a voltage source or ground. A third terminal of the first transistor, comprising one of a collector and a drain, is coupled to a resistor at a first node. A third terminal of the second transistor, comprising one of a collector and a drain, is also coupled to the first node and the first terminal of the resistor. This node is also coupled to the noninverting inputs of the first and second operational amplifiers. The busline is terminated at the second electrode of the resistor. The third electrode of the first transistor provides a current source for when a cable line sinks current away from the output. The third electrode of the second transistor provides a current sink for when a cable line sourced current into the output. Since the circuit can maintain the regulated voltage while sourcing current from the output or sinking current into the output, no clamping circuitry is required to maintain the regulated voltage when current is driven into the output. dr

BRIEF DESCRIPTION OF THE FIGURES

The invention may be understood by reference to the accompanying figures, of which.

DETAILED DESCRIPTION OF THE INVENTION

Figure 5:
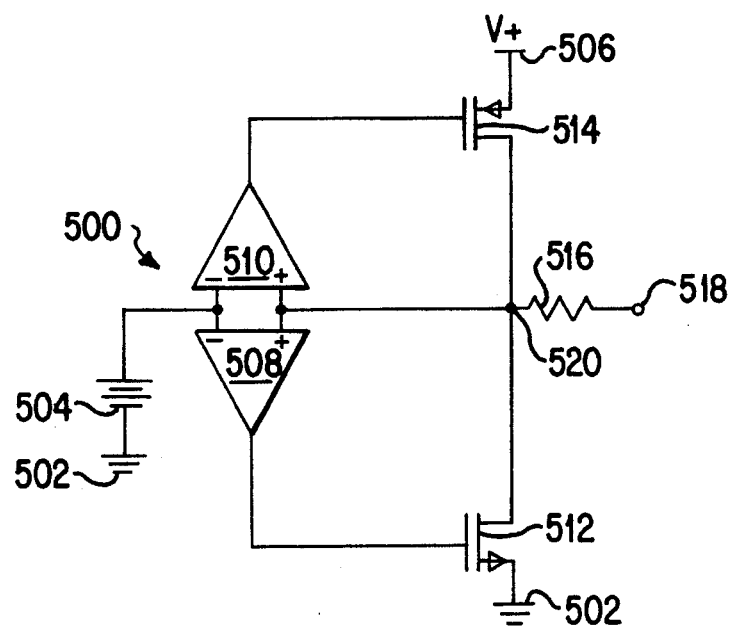
FIG. 5 is directed to a schematic of a preferred embodiment of the present invention of a sink and source voltage regulator.

FIG. 5 shows an embodiment 500 of the present invention. A reference voltage 504, which may be provided by a Brokaw cell and amplifier or any other voltage reference generator (and preferably temperature compensated), is coupled to the inverting inputs of operational amplifiers 508 and 510. The outputs of operational amplifiers 508 and 510 are coupled to the gates of the field effect transistors 512 and 514, respectively. Field effect transistor 514 is a p-channel transistor that is coupled to a voltage source 506 at the source and to the noninverting inputs of operational amplifiers 508 and 510 at a regulated node 520. Field effect transistor 512 is an n-channel transistor that is coupled to ground at a source and to the regulated node 520 at a drain.

The terminating resistance 516 is coupled to the regulated node 520 at a first electrode and provides an output 518 at a second electrode. When output 518 is coupled to a cable line (not shown), field effect transistor 514 provides a current source at the drain when the cable line sinks current from the output 518 and field effect transistor 512 provides a current sink when the cable line sources current into the output 518. As result, this embodiment can fix the voltage at regulated node 520 at the reference voltage when current is driven into the regulator without clamping circuitry.

In another embodiment of the present invention, output drivers are coupled to the output node 518 to assert or negate the cable line (not shown). The output drivers can include push/pull drivers, active negation devices, or totem pole connections.

In another embodiment, field effect transistor 512 and 514 are replaced with bipolar transistors (not shown). The bipolar transistor replacing field effect transistor 514 is a pnp type having a base coupled with the output of operational amplifier 510, a collector coupled to the regulation node and an emitter coupled to the voltage source 506. The bipolar transistor replacing field effect transistor 512 is an npn type having a base coupled to the output of operational amplifier 508, a collector coupled to the regulation node 520 and an emitter coupled to ground 502.

Figure 6:
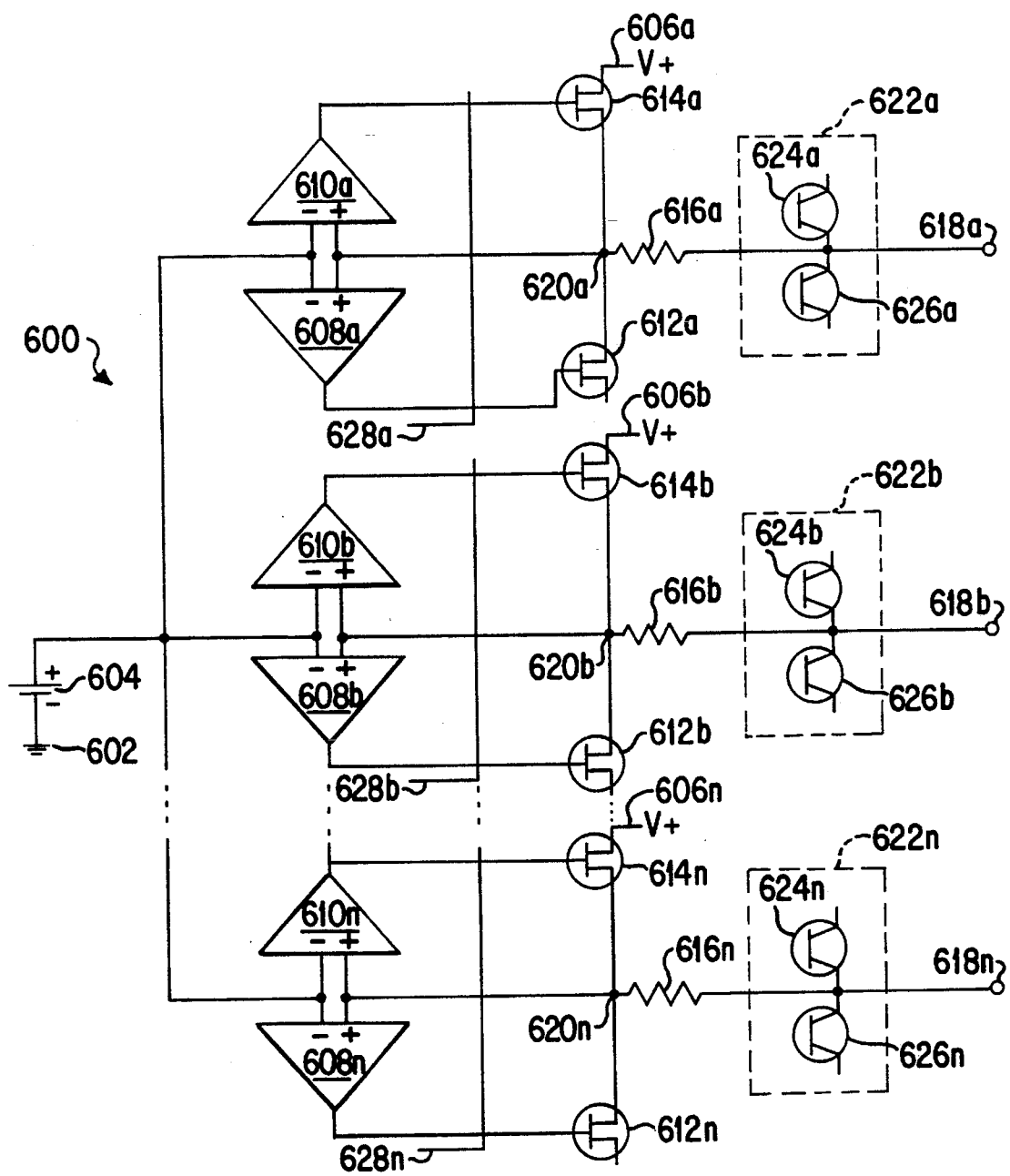
FIG. 6 is directed to a schematic of a preferred embodiment of the present invention of a sink and source voltage regulator in a parallel bus terminator.

FIG. 6 shows an embodiment of the present invention in a multi cable line bus terminator having a voltage reference for all cable lines in the terminator. A reference voltage 604 is coupled to inverting inputs of operational amplifiers 608a, 608b, ... 608n and 610a, 610b, ... 610n. The outputs of operational amplifiers 608a, 608b, ... and 608n are coupled to the gates of field effect transistors 612a, 612b, ... and 612n respectively. The outputs of operational amplifiers 610a, 610b, ... and 610n are coupled to the gates of field effect transistors 614a, 614b, ... and 614n, respectively. Field effect transistors 614a, 614b, ... and 614n are p-channel transistors that are coupled to voltage sources 606a, 606b, ... and 606n at the sources, respectively, and to the noninverting inputs of operational amplifiers 608a, 608b, ... and 608n and 610a, 610b, ... and 610n at regulated nodes 620a, 620b, ... and 620n, respectively. Field effect transistors 612a, 612b, ... and 612n, are n-channel transistors coupled to ground at the sources and to the regulated nodes 520a, 520b, ... and 520n, respectively, at the drains.

The terminating resistors 616a, 616b, ... and 616n are coupled to the regulated nodes 620a, 620b, ... and 620n at first electrodes, respectively, and provide outputs 618a, 618b, ... and 618n at second electrodes. When outputs 618a, 618b, ... and 618n are coupled to cable lines (not shown), field effect transistors 614a, 614b, and ... 614n provide a current source at the drains for when a cable line sinks current from one of the outputs 618a, 618b, ... and 618n and the corresponding field effect transistor of transistors 612a, 612b, ... and 612n provide current sinks when cable lines source current into the corresponding output of outputs 618a, 618b, ... and 618n.

The embodiment of FIG. 6 also includes output drivers 622a, 622b, ... and 622n coupled to the output nodes 618a, 618b, ... 618n, respectively. Output drivers 622 assert and negate the cable lines rapidly. The output drivers 622a, 622b, ... and 622n have totem pole connections including first bipolar transistors 624a, 624b, ... and 624n coupled to the cable lines at emitters, to provide current sources, and second bipolar transistors 626a, 626b, ... and 626n coupled to the cable lines at collectors, to provide current sinks. A cable line is asserted when a second transistor pulls current from the cable lines and negated when a first transistor push current into the cable line.

Figure 1:
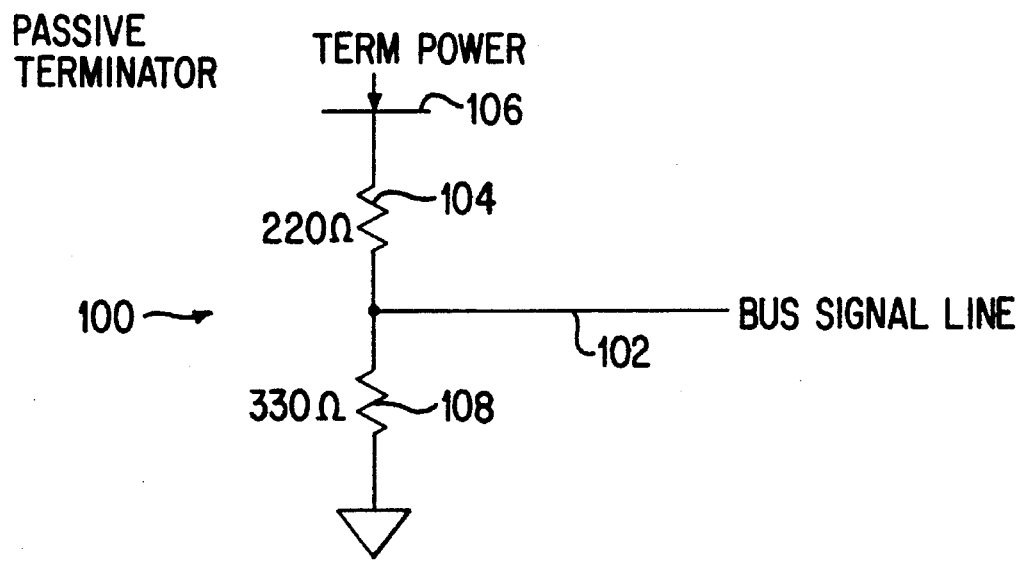
FIG. 1 is directed to a schematic of a prior art passive terminator for a computer bus.
Figure 2:
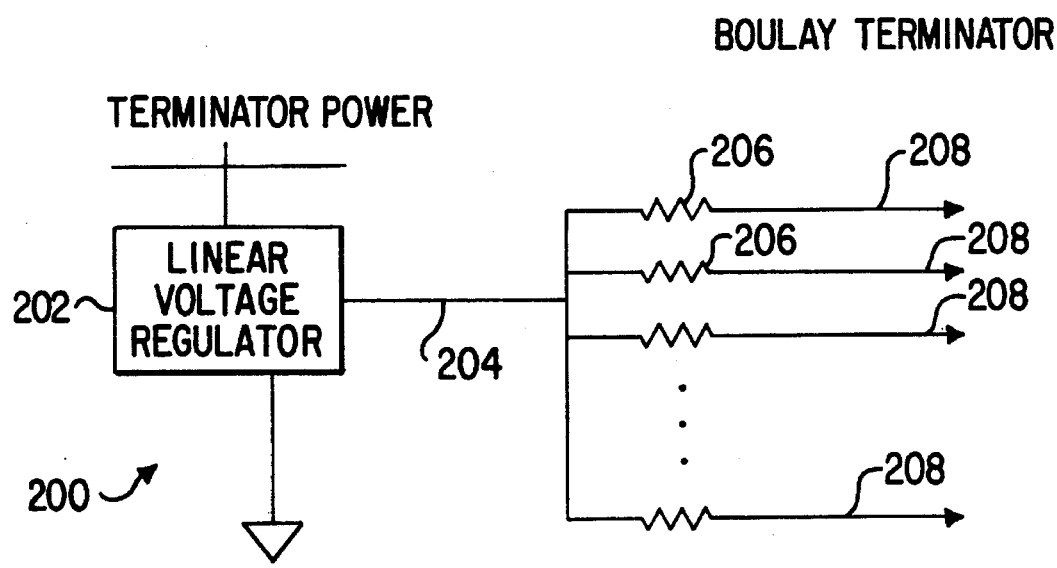
FIG. 2 is directed to a schematic of a prior art Boulay terminator which uses active voltage regulation to improve noise immunity and reduce average power dissipation.
Figure 3:
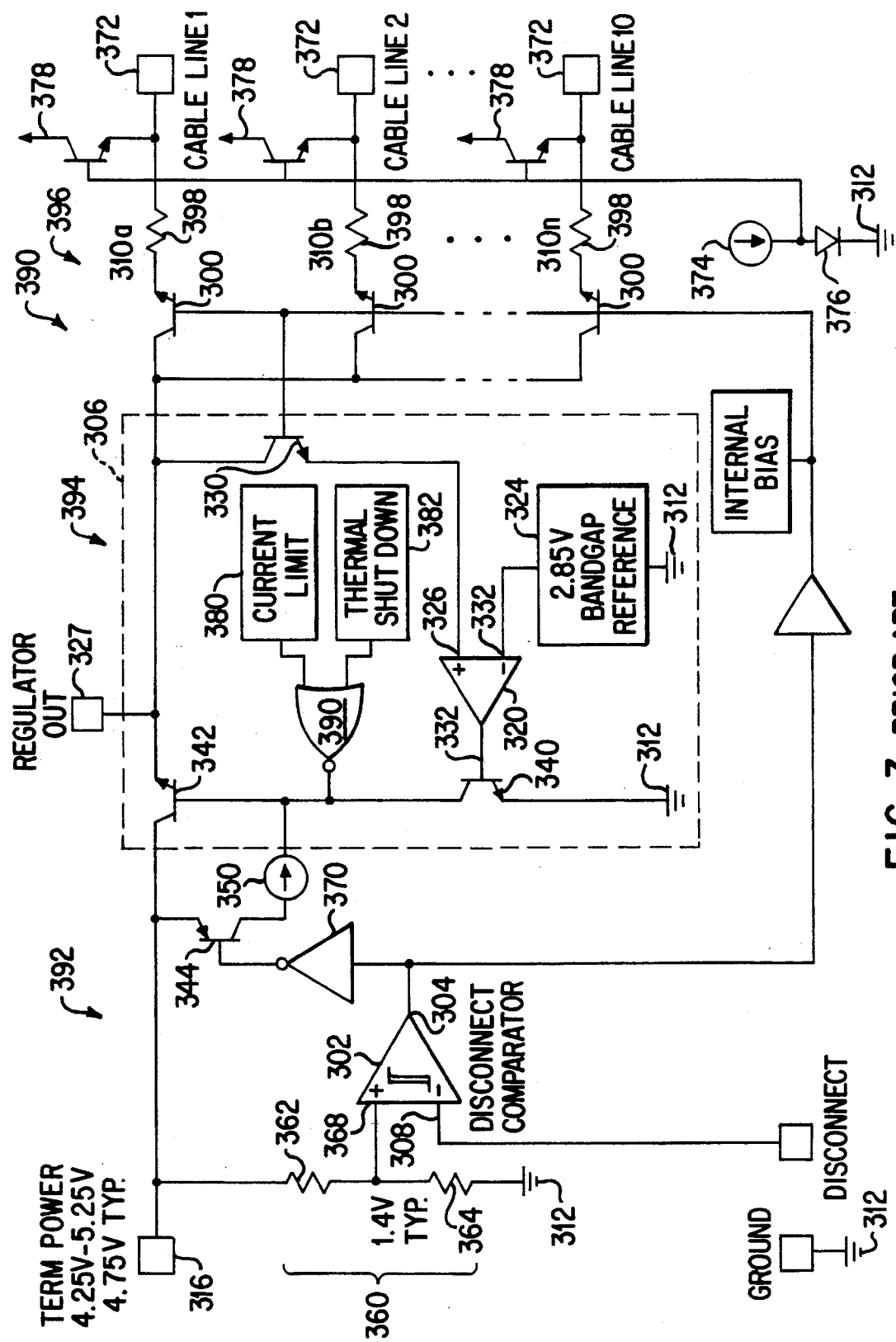
FIG. 3 is directed to a schematic of a prior art controllable active terminator for a computer bus using a source only voltage regulator and clamping circuitry to sink current from the cable lines to the bus terminator.
Figure 4:
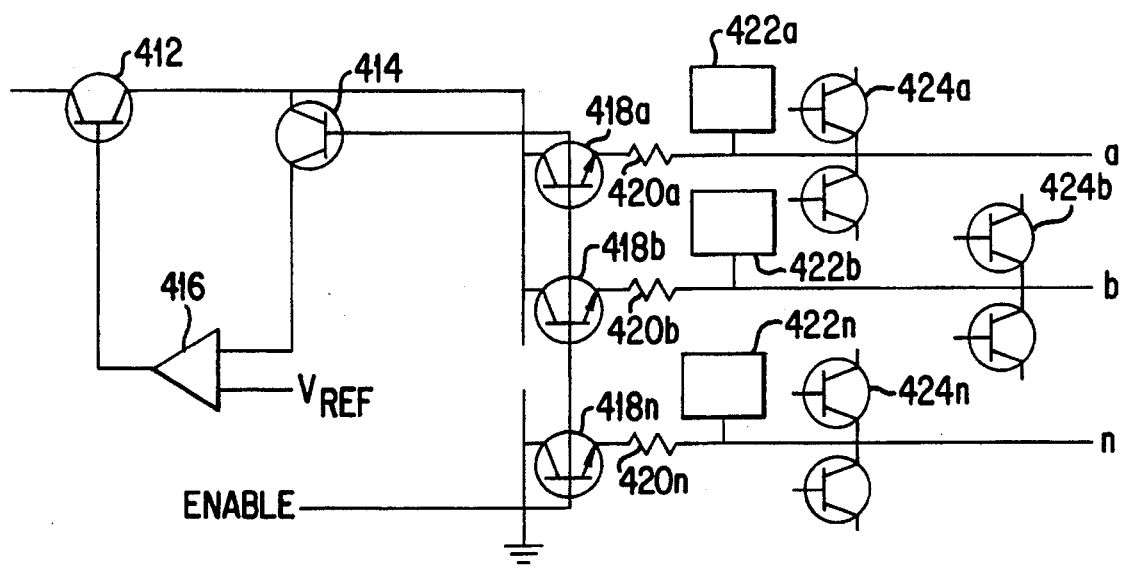
FIG. 4 is directed to a schematic of a prior art controllable active terminator having totem pole drivers coupled to the cable lines.

The embodiment of FIG. 6 further includes a mechanism to enable and disable the terminator at 628a, 628b, ... and 628n. In one embodiment the mechanism includes bipolar transistors such as the transistors 300 in FIG. 3. Here, the output terminals of the operational amplifiers 610a, 610b, . . . and 610n and 608a, 608b, ... and 608n are coupled to the control electrodes of transistors 614a, 614b, ... and 614n, and 612a, 612b, ... and 612n, respectively, through the collectors and emitters of the bipolar transistors at 628a, 628b, ... and 628n. A current is applied to or disconnected from the bipolar transistors at 628a, 628b, ... and 628n to enable or disable the terminator or to the amplifiers (not shown) 608a. . . 608n and 610a. . . 610n to disable the terminators.

The embodiments disclosed in this description provide an improved voltage regulator for use in high speed bus terminators. To address the effects of signal reflection because of mismatching the impedances of bus terminators and cable lines, this regulator maintains a regulated voltage while providing a current source when the cable line sinks current away from the terminator and current source when the cable line sources current into the terminator.

Additionally, the regulator disclosed can be used with other types of assertion/negation circuitry such as push/pull drivers that can cause the regulated voltage output to drift higher. The regulator sinks and sources current to maintain the regulated voltage at the regulation node.

Since the regulator disclosed does not employ clamping circuitry to sink current when the cable lines source current into the terminator, fewer components are required, no deadband associated with clamping circuitry causing cable voltages to drift higher thus making low level assertion during transmission more difficult. Consequently, signal quality is improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

I claim:

1. A voltage regulator, the voltage regulator comprising:

first and second operational amplifiers, each operational amplifier having an output, a noninverting input, and an inverting input, the inverting input of each operational amplifier being coupled to a reference voltage;

a first transistor having a control electrode comprising one of a base and a gate, a second electrode comprising one of an emitter and a source, and a third electrode comprising one of a collector and a drain, wherein the control electrode of the first transistor is coupled to the output of the first operational amplifier, the second electrode of the first transistor is coupled to a voltage source, and the third electrode of the first transistor is coupled to one of the noninverting input of the first operational amplifier and the noninverting input of the second operational amplifier;

a second transistor having a control electrode comprising one of a base and a gate, a second electrode comprising one of an emitter and a source, and a third electrode comprising one of a collector and a drain, wherein the control electrode of the second transistor is coupled to the output of the second operational amplifier, and the third electrode of the second transistor is coupled to one of the third electrode of the first transistor and the noninverting inputs of the first and second operational amplifier; and a resistor coupled at a first electrode to one of the noninverting inputs of the first and second operational amplifiers, and the third electrode of the first transistor and the third electrode of the second transistor, the resistor providing an output at a second electrode, wherein the third electrode of the first transistor is a source for current sunk from the voltage output and the third electrode of the second transistor is a sink for current sourced into the voltage output.

2. The voltage regulator of claim 1, wherein the voltage at the first electrode of the resistors is fixed to the reference voltage.

3. The voltage regulator of claim 1, wherein the first transistor is a bipolar pnp transistor and the second transistor is a bipolar npn transistor.

4. The voltage regulator of claim 1, wherein the first transistor is p-channel field effect transistor and the second transistor is an n-channel field effect transistor.

5. A method for regulating a voltage at an output, the method comprising:

providing a reference voltage at a node of inputs of first and second operational amplifiers, each operational amplifier having an output, a noninverting input, and an inverting input, the step including providing the voltage reference to the inverting inputs of the first and second operational amplifiers;

determining a voltage difference between the inverting input and noninverting input of the first operational amplifier;

determining a voltage difference between the inverting input and noninverting input of the second operational amplifier;

providing one of a first voltage and a first current to a first transistor at a control electrode, the first transistor having a control electrode comprising one of a base and a gate, a second electrode comprising one of an emitter and a source, and a third electrode comprising one of a collector and a drain, wherein the one of the first voltage and first current is based upon the voltage difference between the inverting and noninverting inputs of the first operational amplifier;

providing one of a second voltage and a second current to a second transistor at a control electrode, the second transistor having a control electrode comprising one of a base and a gate, a second electrode comprising one of an emitter and a source, and a third electrode comprising one of a collector and a drain, wherein the one of the second voltage and second current is based upon the difference between the inverting and noninverting inputs of the second operational amplifier;

generating a third current from the third electrode of the first transistor to a second node based upon one of the first voltage and the first current;

generating a fourth current from the third electrode of the second transistor to the second node based upon one of the second voltage and second current;

providing a voltage output at a first electrode of a resistor, the resistor having first and second electrodes, based upon a voltage at the second node, wherein the third electrode of the first transistor is a source for current sunk from the voltage output and the third electrode of the second transistor is a sink for current sourced into the voltage output.

6. The method of claim 5, wherein the voltage at the second node is fixed to the reference voltage.

7. The method of claim 5, wherein the first transistor is a bipolar pnp transistor and the second transistor is a bipolar npn transistor.

8. The voltage regulator of claim 5, wherein the first transistor is p-channel field effect transistor and the second transistor is an n-channel field effect transistor.

9. A method for making a voltage regulator, the method comprising:

forming in a semiconductor die first and second operational amplifiers, each operational amplifier having an output, a noninverting input, and an inverting input, the inverting input of each operational amplifier being coupled to a reference voltage;

forming a first transistor having a control electrode comprising one of a base and a gate coupled to the output terminal of the first operational amplifier, a second electrode comprising one of an emitter and a source coupled to a voltage source, and a third electrode comprising one of a collector and a drain coupled to the noninverting input of the first operational amplifier and the noninverting input of the second operational amplifier in the same die;

forming a second transistor having a control electrode comprising one of a base and a gate coupled to the output terminal of the second operational amplifier, a second electrode comprising one of an emitter and a source, and a third electrode comprising one of a collector and a drain coupled to one of the third electrode of the first transistor and the noninverting inputs of the first and second operational amplifier in the same die; and forming a resistor in the same die, the resistor having first and second electrodes, the first electrode being coupled to one of the noninverting inputs of the first and second operational amplifiers, and the third electrode of the first transistor and the third electrode of the second transistor, wherein the second electrode of the resistor provides an output and the third electrode of the first transistor is a source for current sunk from the output and the third electrode of the second transistor is a sink for current sourced into the output.

10. The method of claim 9, wherein the voltage at the first electrode of the resistor is fixed to the reference voltage.

11. The method of claim 9, wherein the first transistor is a bipolar pnp transistor and the second transistor is a bipolar npn transistor.

12. The method of claim 9, wherein the first transistor is p-channel field effect transistor and the second transistor is an n-channel field effect transistor.

13. In a parallel bus terminator having a plurality of cable line connectors, each connector coupled to an enabler and a first electrode of a resistor, the resistor having first and second electrodes, wherein the improvement comprises having for each connector:

first and second operational amplifiers, each operational amplifier having an output, a noninverting input, and an inverting input, the inverting input of each operational amplifier being coupled to a reference voltage;

a first transistor having a control electrode comprising one of a base and a gate, a second electrode comprising one of an emitter and a source, and a third electrode comprising one of a collector and a drain, wherein the control electrode of the first transistor is coupled to the output of the first operational amplifier, and the third electrode of the first transistor is coupled to the noninverting input of the first operational amplifier and the noninverting input of the second operational amplifier; and a second transistor having a control electrode comprising one of a base and a gate, a second electrode comprising one of an emitter and a source, and a third electrode comprising one of a collector and a drain, wherein the control electrode of the second transistor is coupled to the output of the second operational amplifier, and the third electrode of the second transistor is coupled to one of the third electrode of the first transistor and the noninverting inputs of the first and second operational amplifier, wherein one of the third electrode of the first transistor and the third electrode of the second transistor provide an output to the connector through the enabler and the second electrode of the resistor, and wherein when the connectors are enabled, the third electrode of the first transistor is a source for current sunk from the output and the third electrode of the second transistor is a sink for current sourced into the output.

14. The parallel bus terminator of claim 13, wherein the voltage at the second electrode of the resistor is fixed to the reference voltage.

15. The parallel bus terminator of claim 13, wherein the first transistor is a bipolar pnp transistor and the second transistor is a bipolar npn transistor.

16. The parallel bus terminator of claim 13, wherein the first transistor is p-channel field effect transistor and the second transistor is an n-channel field effect transistor.

17. The parallel bus terminator of claim 13, wherein each cable line connector comprises:

a node coupled to one of the enabler and the first electrode of the resistor;

a first transistor having one of an emitter and a source coupled to an output to provide a current source to negate the cable line; and a second transistor having one of a collector and a drain coupled to the output to provide a current sink to assert the cable line.

18. An apparatus for regulating a voltage at an output, the apparatus comprising:

means for providing a reference voltage at a node of inputs of first and second operational amplifiers, each operational amplifier having an output, a noninverting input, and an inverting input, the step including providing the voltage reference to the inverting inputs of the first and second operational amplifiers;

means for determining a voltage difference between the inverting input and noninverting input of the first operational amplifier;

means for determining a voltage difference between the inverting input and noninverting input of the second operational amplifier;

means for providing one of a first voltage and a first current to a first transistor at a control electrode, the first transistor having a control electrode comprising one of a base and a gate, a second electrode comprising one of an emitter and a source, and a third electrode comprising one of a collector and a drain, wherein the one of the first voltage and first current is based upon the difference between the inverting and noninverting inputs of the first operational amplifier;

means for providing one of a second voltage and a second current to a second transistor at a control electrode, the second transistor having a control electrode comprising one of a base and a gate, a second electrode comprising one of an emitter and a source, and a third electrode comprising one of a collector and a drain, wherein the one of the second voltage and the second current is based upon the voltage difference between the inverting and noninverting inputs of the second operational amplifier;

means for generating a third current from the third electrode of the first transistor to a second node based upon one of the first voltage and the first current;

means for generating a fourth current from the third electrode of the second transistor to the second node based upon one of the second voltage and second current;

means for providing a voltage output at a first electrode of a resistor, the resistor having first and second electrodes, based upon a voltage at the second node, wherein the third electrode of the first transistor is a source for current sunk from the voltage output and the third electrode of the second transistor is a sink for current sourced into the voltage output.

19. The apparatus of claim 18, wherein the voltage at the second node is fixed to the reference voltage.

* * * * *